(12) United States Patent
Kuriyama et al.

(10) Patent No.: US 12,388,494 B2
(45) Date of Patent: Aug. 12, 2025

(54) COMMUNICATION PATH ESTIMATION METHOD, WIRELESS COMMUNICATION SYSTEM, TRANSMITTER, AND RECEIVER

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Toshifumi Miyagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/273,550

(22) PCT Filed: Jan. 26, 2021

(86) PCT No.: PCT/JP2021/002677
§ 371 (c)(1),
(2) Date: Jul. 21, 2023

(87) PCT Pub. No.: WO2022/162737
PCT Pub. Date: Aug. 4, 2022

(65) Prior Publication Data
US 2024/0080066 A1    Mar. 7, 2024

(51) Int. Cl.
*H04B 7/005* (2006.01)
*H04L 5/00* (2006.01)
*H04L 25/02* (2006.01)

(52) U.S. Cl.
CPC ........... *H04B 7/005* (2013.01); *H04L 5/0048* (2013.01); *H04L 25/0202* (2013.01)

(58) Field of Classification Search
CPC ... H04B 7/005; H04L 5/0048; H04L 25/0202; H04L 25/0212; H04L 25/0224
See application file for complete search history.

(56) References Cited

U.S. PATENT DOCUMENTS

| 8,005,153 B2 * | 8/2011 | Muharemovic ..... H04L 27/2613 375/259 |
| 2002/0003802 A1 * | 1/2002 | Kim .................... H04L 12/6418 379/401 |

(Continued)

FOREIGN PATENT DOCUMENTS

| GB | 2338149 A | * 12/1999 | ........... H04B 7/0814 |
| JP | H05-145452 A | 6/1993 | |

OTHER PUBLICATIONS

Machine translation of JP-2012199750-A (Year: 2012).*

(Continued)

*Primary Examiner* — Jean B Corrielus
(74) *Attorney, Agent, or Firm* — XSENSUS LLP

(57) ABSTRACT

A channel estimation method in which a reception device performs channel estimation on the basis of a known signal transmitted by a transmission device divides and arranges a known signal having a predetermined length in frames, transmits the known signal divided and arranged in the frames together with a data signal as a radio frame, receives the transmitted radio frame, calculates a data signal component including a delay wave component from the received radio frame, extracts a plurality of known signal components each including a delay wave component of the divided and arranged known signal by subtracting the data signal component from the received radio frame, concatenates the plurality of extracted known signal components to restore a known signal having a predetermined length, and performs channel estimation on the basis of the restored known signal having a predetermined length.

8 Claims, 9 Drawing Sheets

(56) References Cited

U.S. PATENT DOCUMENTS

2015/0023279 A1* 1/2015 Tomeba .............. H04L 27/3455
                                              370/329
2016/0173175 A1* 6/2016 Tomeba .............. H04L 25/0391
                                              370/329

OTHER PUBLICATIONS

Machine translation of KR-20010070457-A (Year: 2001).*
Machine translation of JP-H10271557-A (Year: 1998).*
"Part 11: Wireless LAN Medium Access Control (MAC) and Physical Layer (PHY) Specifications" IEEE Std. 802.11, IEEE Computer Society, Mar. 29, 2012, pp. 1-2695.

* cited by examiner

COMMUNICATION PATH ESTIMATION METHOD, WIRELESS COMMUNICATION SYSTEM, TRANSMITTER, AND RECEIVER

The present application is a 371 of international application PCT/JP2021/002677, filed Jan. 26, 2021, the entire contents of which are incorporated herein by reference.

TECHNICAL FIELD

The present invention relates to a channel estimation method, a wireless communication system, a transmission device, and a reception device.

BACKGROUND ART

In a wireless communication system, deterioration in communication quality due to, for example, inter-symbol interference caused by a multipath is compensated for by an equalizer. Further, in a wireless communication system of the related art, a maximum delay time of an assumed delay wave (hereinafter referred to as a delay wavelength) is considered in advance, and channel estimation is performed using a designed fixed-length training signal section (for example, see NPL 1).

In this case, when an assumed delay wavelength is long, a longer training signal section is required to prevent inter-symbol interference.

CITATION LIST

Non Patent Literature

[NPL 1] Wireless LAN Medium Access Control (MAC) and Physical Layer (PHY) Specifications, IEEE Std. 802.11, 29 Mar. 2012.

SUMMARY OF INVENTION

Technical Problem

When a channel is estimated using a fixed-length training signal section, a delay wavelength that can be estimated is also fixed. In this case, delay waves exceeding the delay wavelength that can be estimated cannot be estimated, a channel estimation error increases, and a bit error rate increases.

Further, when the assumed delay wavelength is long, it is possible to estimate the channel by setting a longer training signal section, but there is a problem that the transmission capacity is reduced.

The present invention has been made in view of the problem described above, and an object of the present invention is to provide a channel estimation method, a wireless communication system, a transmission device, and a reception device capable of improving accuracy of channel estimation without reducing transmission capacity even in a long delay wave environment.

Solution to Problem

A channel estimation method according to an aspect of the present invention is a channel estimation method in which a reception device performs channel estimation on the basis of a known signal transmitted by a transmission device, the channel estimation method including: a division and arrangement step of dividing and arranging a known signal having a predetermined length in frames; a transmission step of transmitting, as a radio frame, the known signal divided and arranged in the frames together with a data signal; a reception step of receiving the transmitted radio frame; a calculation step of calculating a data signal component including a delay wave component from the received radio frame; an extraction step of extracting a plurality of known signal components each including a delay wave component of the divided and arranged known signal by subtracting the data signal component from the received radio frame; a restoration step of concatenating the plurality of extracted known signal components to restore a known signal having a predetermined length; and an estimation step of performing channel estimation on the basis of the restored known signal having a predetermined length.

A radio communication system according to an aspect of the present invention is a wireless communication system in which a reception device performs channel estimation on the basis of a known signal transmitted by a transmission device, wherein the transmission device includes a division and arrangement unit configured to divide and arrange a known signal having a predetermined length in frames; and a transmission unit configured to transmit, as a radio frame, the known signal divided and arranged in the frames by the division and arrangement unit together with a data signal, and the reception device includes a reception unit configured to receive the radio frame transmitted by the transmission unit; a calculation unit configured to calculate a data signal component including a delay wave component from the radio frame received by the reception unit; an extraction unit configured to extract a plurality of known signal components each including a delay wave component of the divided and arranged known signal by subtracting the data signal component from the radio frame received by the reception unit; a restoration unit configured to concatenate the plurality of known signal components extracted by the extraction unit to restore a known signal having a predetermined length; and an estimation unit configured to perform the channel estimation on the basis of the known signal having a predetermined length restored by the restoration unit.

Further, a transmission device according to an aspect of the present invention is a transmission device for transmitting a known signal to a reception device for performing channel estimation on the basis of a known signal, the transmission device including: a division and arrangement unit configured to divide and arrange a known signal having a predetermined length in frames; and a transmission unit configured to transmit, as a radio frame, the known signal divided and arranged in the frames by the division and arrangement unit together with a data signal.

A reception device according to one embodiment of the present invention is a reception device for performing channel estimation on the basis of a known signal transmitted by a transmission device, the reception device including: a reception unit configured to receive, as a radio frame, a known signal divided and arranged in frames together with a data signal; a calculation unit configured to calculate a data signal component including a delay wave component from the radio frame received by the reception unit; an extraction unit configured to extract a plurality of known signal components each including a delay wave component of the divided and arranged known signal by subtracting the data signal component from the radio frame received by the reception unit; a restoration unit configured to concatenate the plurality of known signal components extracted by the extraction unit to restore a known signal having a predetermined length; and an estimation unit configured to perform the channel estimation on the basis of the known signal having a predetermined length restored by the restoration unit.

Advantageous Effects of Invention

According to the present invention, it is possible to improve the accuracy of channel estimation without reducing a transmission capacity even in a long delay wave environment.

DESCRIPTION OF EMBODIMENTS

Figure 8:
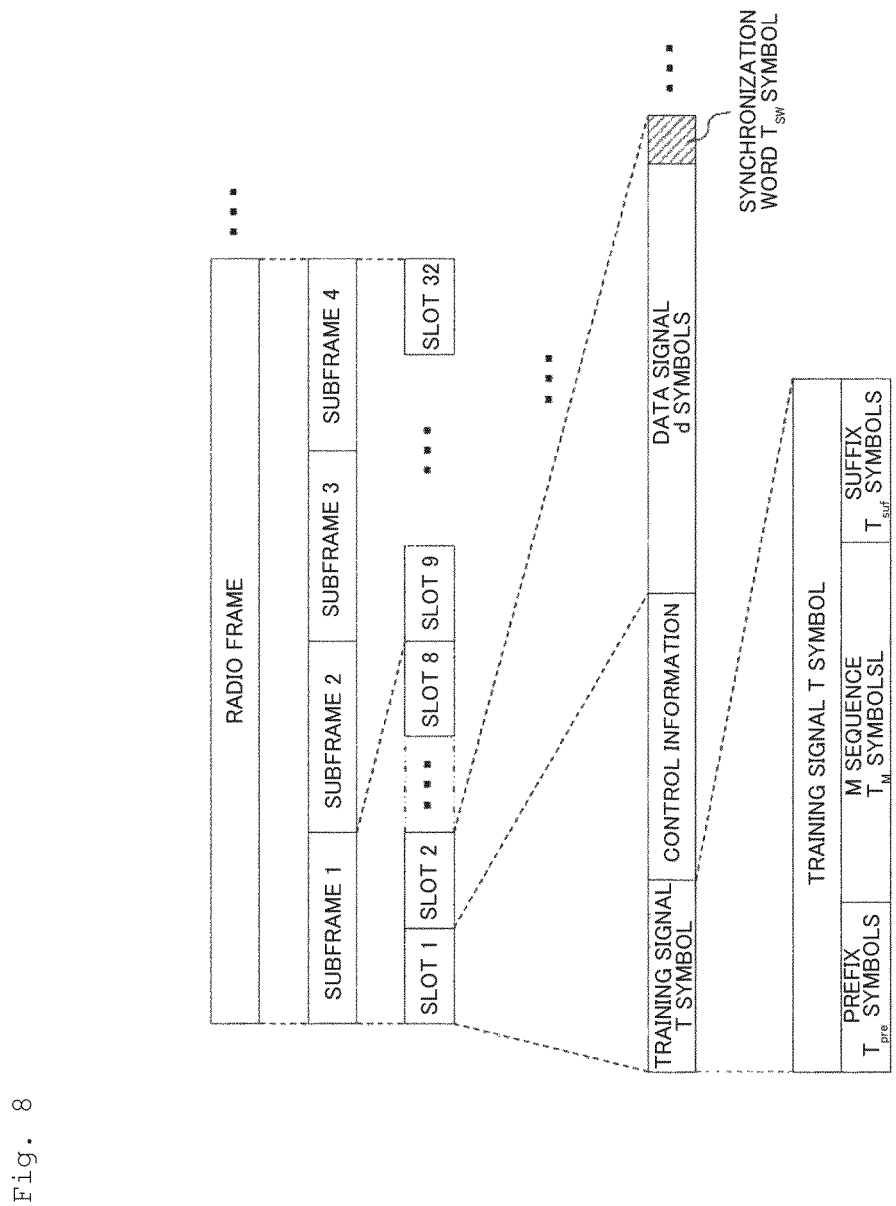
FIG. 8 is a diagram illustrating a structure of a radio frame transmitted by a base station in order for the terminal station to perform channel estimation in a wireless communication system of a comparative example.

First, a background of the present invention will be described in detail. FIG. 8 is a diagram illustrating a structure of a radio frame transmitted by a base station serving as a transmission device in order for a terminal station serving as a reception device to perform channel estimation, for example, in a wireless communication system of a comparative example.

A designer of the wireless communication system of the comparative example considers an assumed delay wavelength and sets a radio frame including a fixed-length training section. For example, a radio frame includes subframes 1 to 4 each including eight slots, as illustrated in FIG. 8.

Slot 1 included in subframe 1 includes a fixed-length training signal of T symbols designed according to the assumed delay wavelength, and control information. Further, the training signal of T symbols includes a prefix of $T_{pre}$ symbols, an M sequence of $T_M$ symbols, and a suffix of $T_{suf}$ symbols. In this case, it is possible to estimate a delay wave up to $T_{suf}+1$ symbols.

Further, slots 2 to 32 each include a data signal of d symbols and a synchronization word of $T_{sw}$ symbols. This radio frame has a frame structure in which a synchronization word is inserted between data signals, and is adopted to perform improvement of the accuracy of channel estimation, updating equalizer parameters, or the like.

When channel estimation is performed by sliding correlation in a time domain using this radio frame, for example, the terminal station receives a training signal in slot 1 transmitted by the base station, and the terminal station estimates a channel response to calculate an equalization weight.

The terminal station receives the data signal and the synchronization word of slots 2 to 32 transmitted by the base station. The terminal station equalizes and demodulates the received signal, updates the equalization weight using the synchronization word, and further equalizes and demodulates the received signal. In this case, because the terminal station uses a fixed-length training signal section for channel estimation, a delay wavelength that can be estimated is also fixed.

For example, the terminal station performs slide correlation using a correlation sequence such as the M sequence as a training signal to estimate the channel response. However, because the delay wavelength that can be estimated is fixed, the accuracy of the channel estimation deteriorates when a delay wavelength in an actual propagation environment is longer than an assumed one.

Figure 9:
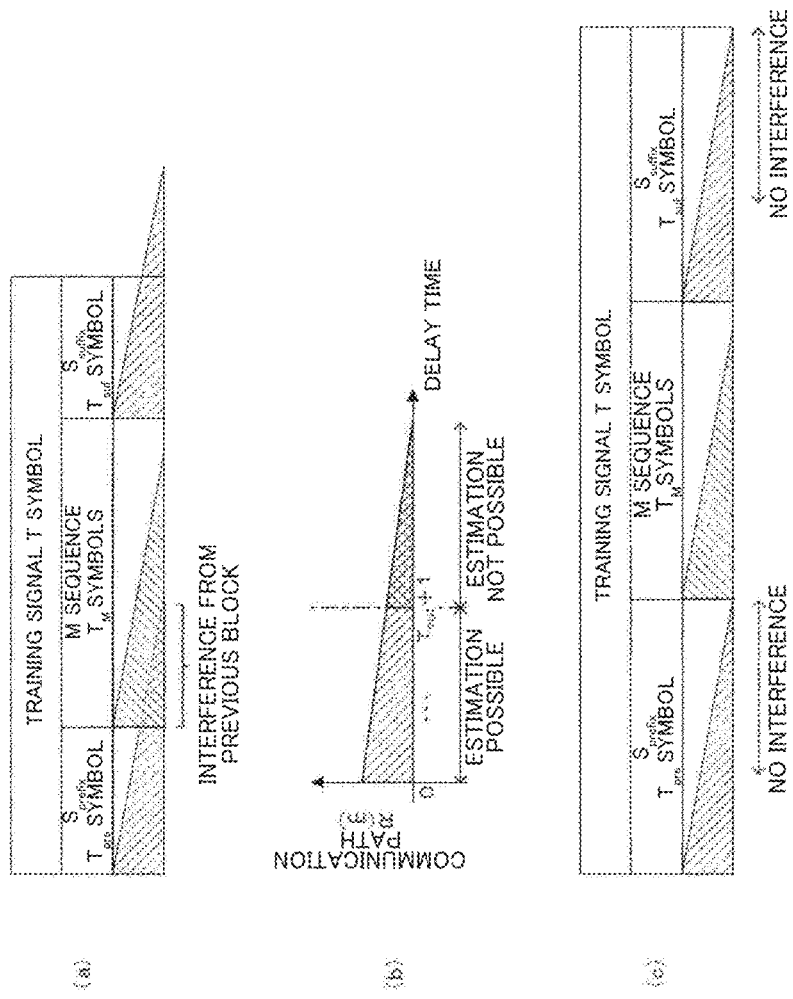
FIG. 9(a) is a diagram schematically illustrating a delay wave component in a preset actual propagation environment of a training signal.
FIG. 9(b) is a diagram illustrating a channel response estimated by the terminal station.
FIG. 9(c) is a diagram schematically illustrating a training signal for improving accuracy of channel estimation in the comparative example.

FIG. 9 is a diagram schematically illustrating a delay wave component in a training signal received by the terminal station. FIG. 9(a) is a diagram schematically illustrating a delay wave component in a preset actual propagation environment of a training signal. FIG. 9(b) is a diagram illustrating a channel response estimated by the terminal station. FIG. 9(c) is a diagram schematically illustrating a training signal for improving accuracy of channel estimation in the comparative example.

As illustrated in FIG. 9(a), when the delay wavelength in the actual propagation environment is longer than the assumed one, a delay wave component of a previous block ($S_{prefix}$) enters an M sequence S and interferes with the M sequence S, and thus, the accuracy deteriorates when the channel estimation is performed.

As illustrated in FIG. 9(b), the terminal station can only perform the channel estimation up to $T_{suf}+1$ symbols in a slide range, and cannot perform the channel estimation for delay wavelengths exceeding $T_{suf}+1$ symbols, causing a large error in the channel estimation.

Therefore, in the wireless communication system of the comparative example, it is possible to suppress an error in channel estimation without inter-symbol interference when a prefix ($S_{prefix}$) and a suffix ($S_{suf}$) extend as a configuration of the training signal as illustrated in FIG. 9(c).

However, there is a problem that the extension of a training symbol section leads to deterioration of transmission capacity. Therefore, in a wireless communication system according to an embodiment, a virtual long training signal section is generated without extending an actual training signal section and the channel estimation is performed, for example, in a static fading environment (fixed installation, or the like), thereby improving the accuracy of the channel estimation.

Figure 1:
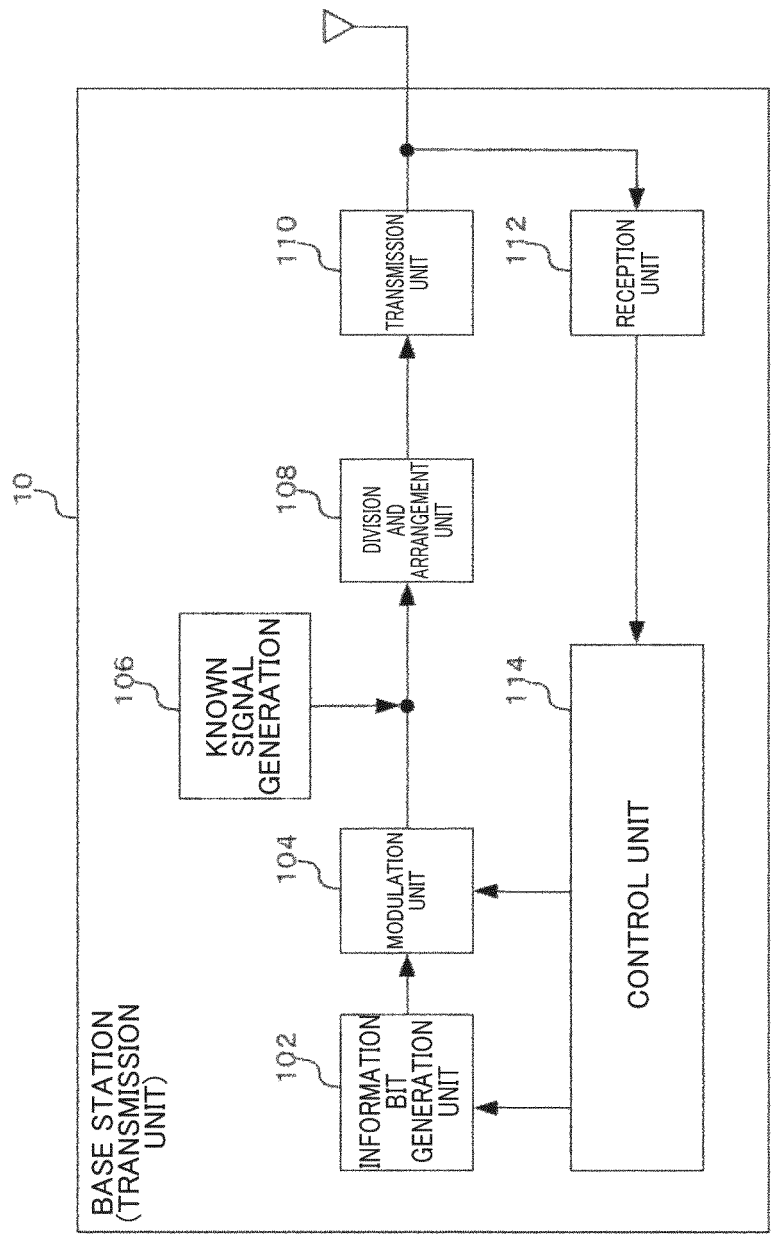
FIG. 1 is a diagram illustrating a configuration example of a base station as a transmission device in a wireless communication system according to an embodiment.

Hereinafter, an embodiment of the wireless communication system will be described below with reference to the drawings. FIG. 1 is a diagram illustrating a configuration example of a base station 10 as a transmission device in the wireless communication system according to the embodiment.

As illustrated in FIG. 1, the base station 10 according to the embodiment includes, for example, an information bit generation unit 102, a modulation unit 104, a known signal generation unit 106, a division and arrangement unit 108, a transmission unit 110, a reception unit 112, and a control unit 114.

The information bit generation unit 102 generates a data signal (data frame) as information bits to be transmitted, and outputs the data signal to the modulation unit 104.

The modulation unit 104 modulates the data signal input from the information bit generation unit 102 according to a setting, and outputs the modulated data signal to the division and arrangement unit 108.

The known signal generation unit 106 generates a training signal and a synchronization word (see FIG. 8) having a predetermined length as known signal for training, and outputs the training signal and the synchronization word to the division and arrangement unit 108.

Figure 2:
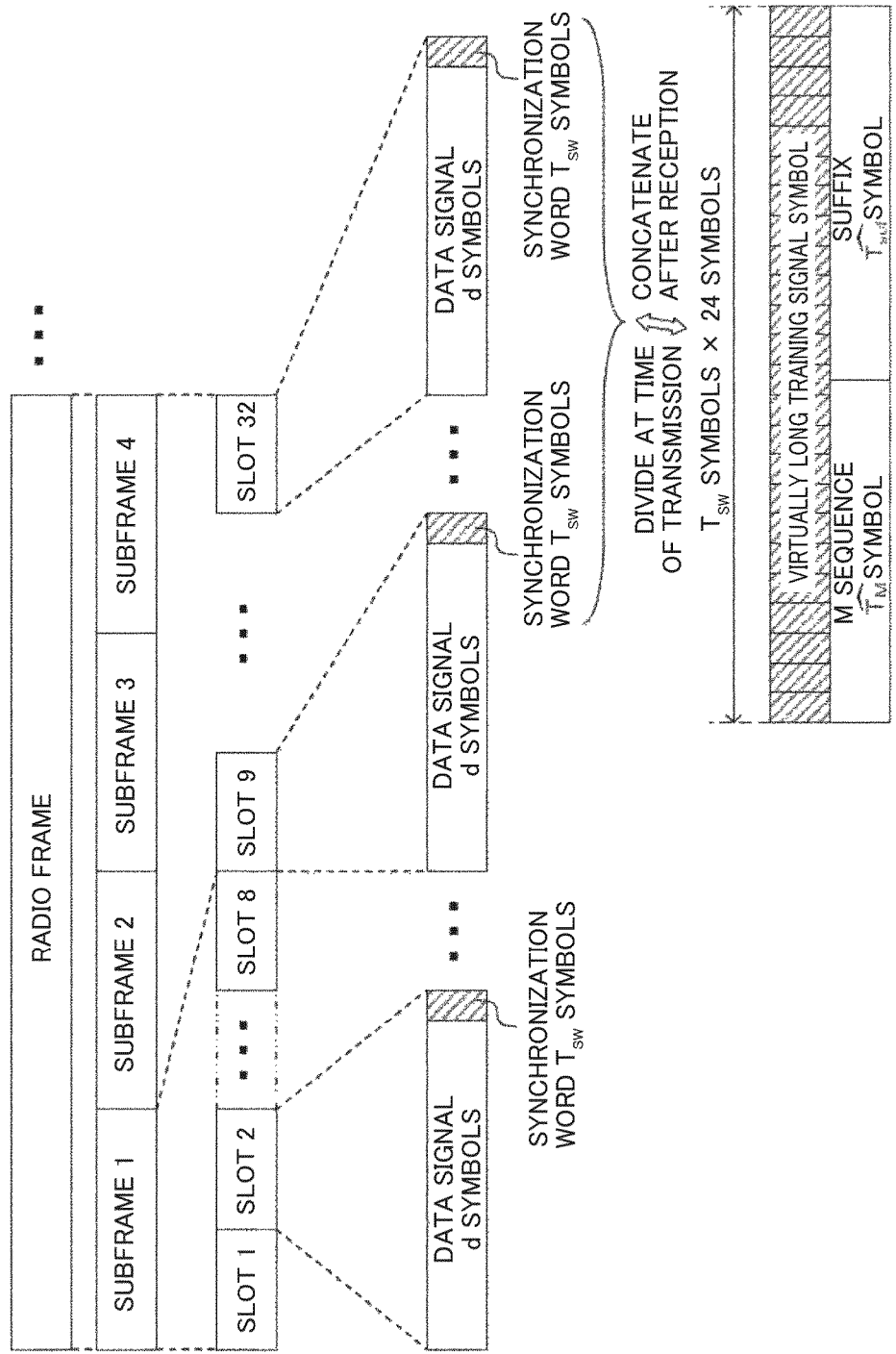
FIG. 2 is a diagram illustrating a structure of a radio frame transmitted by a base station serving as a transmission device in order for a terminal station serving as a reception device to perform channel estimation in the wireless communication system according to the embodiment.

The division and arrangement unit 108 divides and arranges the known signal having a predetermined length generated by known signal generation unit 106 with respect to the modulated data signal output from modulation unit 104 as illustrated in FIG. 2 to obtain a radio frame, and outputs the radio frame to the transmission unit 110.

FIG. 2 is a diagram illustrating a structure of a radio frame transmitted by the base station 10 serving as a transmission device in order for the terminal station 20 serving as a reception device to perform channel estimation in the wireless communication system according to the embodiment.

A radio frame includes subframes 1 to 4 each including eight slots, as illustrated in FIG. 2.

Slot 1 included in subframe 1 includes a fixed-length training signal of T symbols designed according to the assumed delay wavelength, and control information (see FIG. 8). Further, the training signal of T symbols includes a $T_{pre}$ symbol prefix, a TM symbol M sequence, and a $T_{suf}$ symbol suffix. In this case, it is possible to estimate a delay wave up to $T_{suf}+1$ symbols.

Further, slots 2 to 32 each include a data signal of d symbols and a synchronization word of $T_{sw}$ symbols. Specifically, the division and arrangement unit 108 arranges the divided synchronization word next to the data signal in each of slots 2 to 32 to form a radio frame.

The respective synchronization words included in slots 2 to 32 are transmitted with the synchronization words divided and arranged as illustrated in FIG. 2, and are concatenated after the synchronization words are received by the terminal station 20. An operation of the terminal station 20 concatenating the synchronization words will be described below.

The transmission unit 110 converts the radio frame input from the division and arrangement unit 108 into an RF signal (high frequency signal), and transmits the radio frame to the terminal station 20 (see FIG. 3) as a reception device to be described below via an antenna. That is, the transmission unit 110 transmits, as a radio frame, the known signal divided and arranged in the frame by the division and arrangement unit 108 together with the data signal.

The reception unit 112 receives the signal transmitted by the terminal station 20 via an antenna and outputs the signal to the control unit 114, for example. For example, the reception unit 112 receives a result of channel estimation performed by the terminal station 20 on the basis of the known signal divided and arranged within the frame by the division and arrangement unit 108.

The control unit 114 controls the respective units constituting the base station 10. Further, the control unit 114 controls a communication scheme on the basis of the result of the channel estimation received by the reception unit 112. For example, the control unit 114 controls a structure of a data signal (data frame) generated by the information bit generation unit 102 or controls a structure of a data signal (data frame) generated by the modulation unit 104 on the basis of the result of channel estimation received by the reception unit 112.

Figure 3:
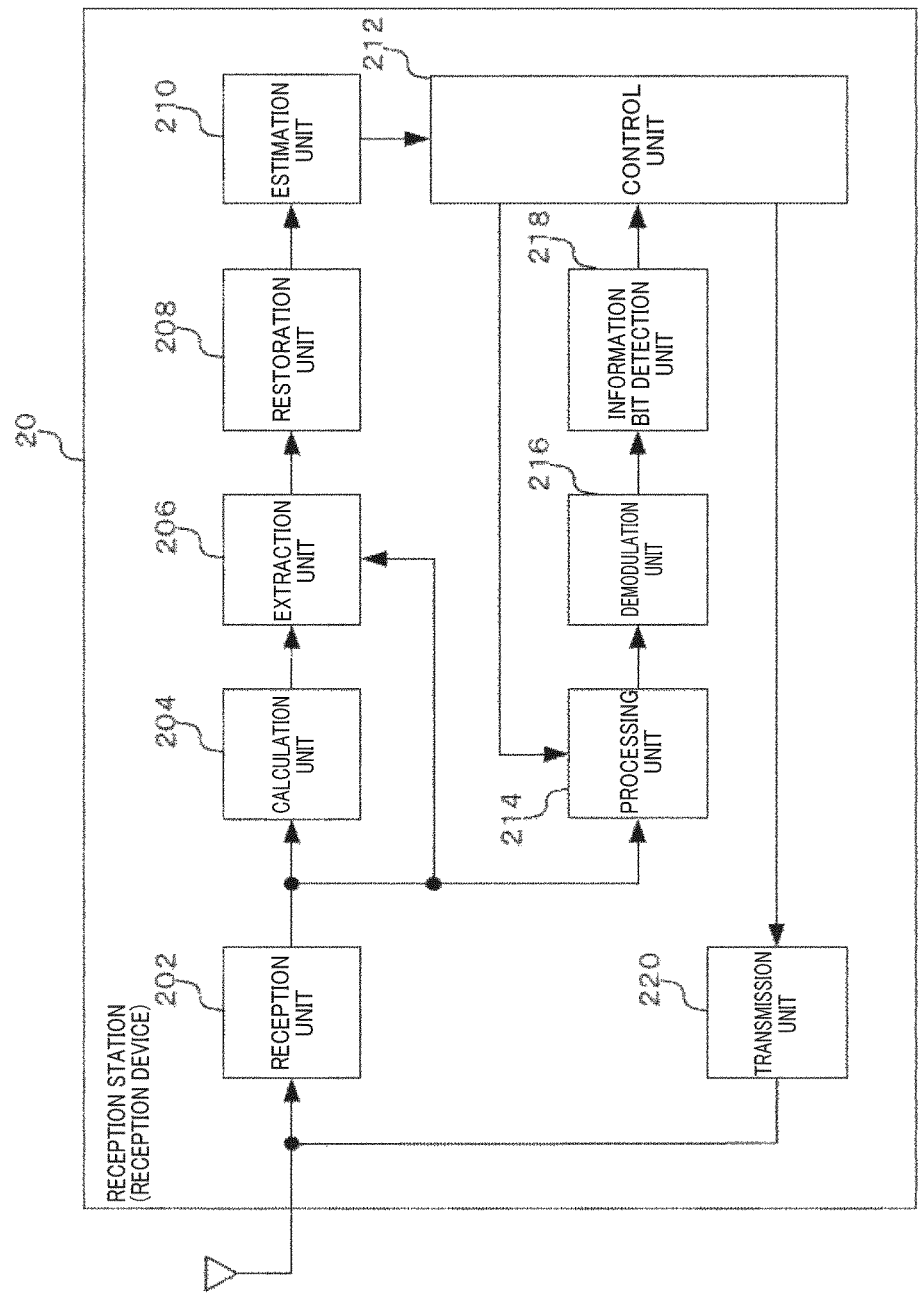
FIG. 3 is a diagram illustrating a configuration example of a terminal station as a reception device in the wireless communication system according to the embodiment.

FIG. 3 is a diagram illustrating a configuration example of the terminal station 20 as a reception device in the wireless communication system according to the embodiment.

As illustrated in FIG. 3, the terminal station 20 according to the embodiment includes a reception unit 202, a calculation unit 204, an extraction unit 206, a restoration unit 208, an estimation unit 210, a control unit 212, an equalization processing unit 214, and a demodulation unit 216, an information bit detection unit 218 and a transmission unit 220.

The reception unit 202 receives the radio frame transmitted by the base station 10 via an antenna, converts a high-frequency signal into a baseband signal, and outputs the baseband signal to the calculation unit 204, the extraction unit 206, and the equalization processing unit 214. However, in a communication environment in which delay waves exist, the data signal and the known signal (the training signal and the synchronization word) included in the radio frame are received in the next slot with overlapping delay wave components.

The terminal station 20 performs wireless communication using the fixed-length training signal section included in slot 1 on subframe 1 (see FIGS. 2 and 8). In this case, the terminal station 20 performs rough estimation for the channel, convergence of a tap coefficient of the equalizer, and the like, through wireless communication in subframe 1.

Figure 4:
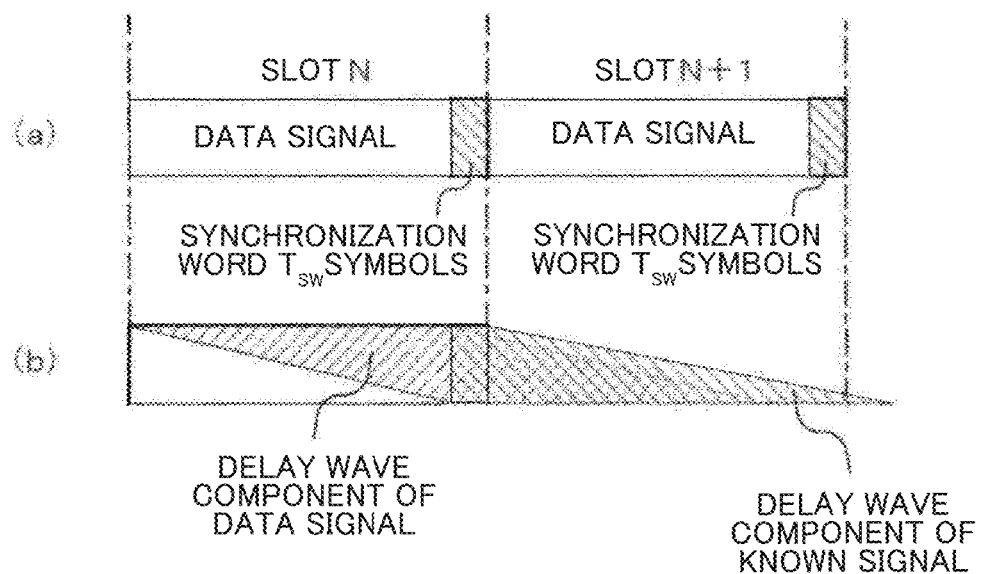
FIG. 4(a) is a diagram schematically illustrating consecutive slots included in a radio frame before reception in a reception unit.
FIG. 4(b) is a diagram schematically illustrating consecutive slots included in a radio frame received by the reception unit.

FIG. 4 is a diagram schematically illustrating consecutive slots included in radio frames (subframe 2 and subsequent frames) before and after reception in the reception unit 202. FIG. 4(a) is a diagram schematically illustrating consecutive slots included in the radio frames before reception in the reception unit 202 (at the time of transmission in the base station 10). FIG. 4(b) is a diagram schematically illustrating consecutive slots included in the radio frames after reception in the reception unit 202.

As illustrated in FIG. 4(a), the synchronization word is placed next to the data signal in each of an N-th slot N and a slot N+1 before reception in the reception unit 202 (at the time of transmission in the base station 10).

On the other hand, after reception in the reception unit 202 (at the time of reception in the terminal station 20), a delay wave component of the data signal in the slot N and the delay wave component of the known signal (synchronization word) in the slot N overlap, as illustrated in FIG. 4(b).

The calculation unit 204 calculates a data signal component including the delay wave component from the radio frame received by the reception unit 202 and outputs the calculated data signal component including the delay wave component to the extraction unit 206. In this case, the calculation unit 204 calculates the data signal component including the delay wave component using, for example, roughly estimated channel information.

The extraction unit 206 subtracts the data signal component including the delay wave component calculated by the calculation unit 204 from the radio frame received by the reception unit 202 to extract a plurality of known signal components each including a delay wave component of a divided and arranged known signal (the training signal, the synchronization word, and the like), and outputs the plurality of known signal components to the restoration unit 208.

Figure 5:
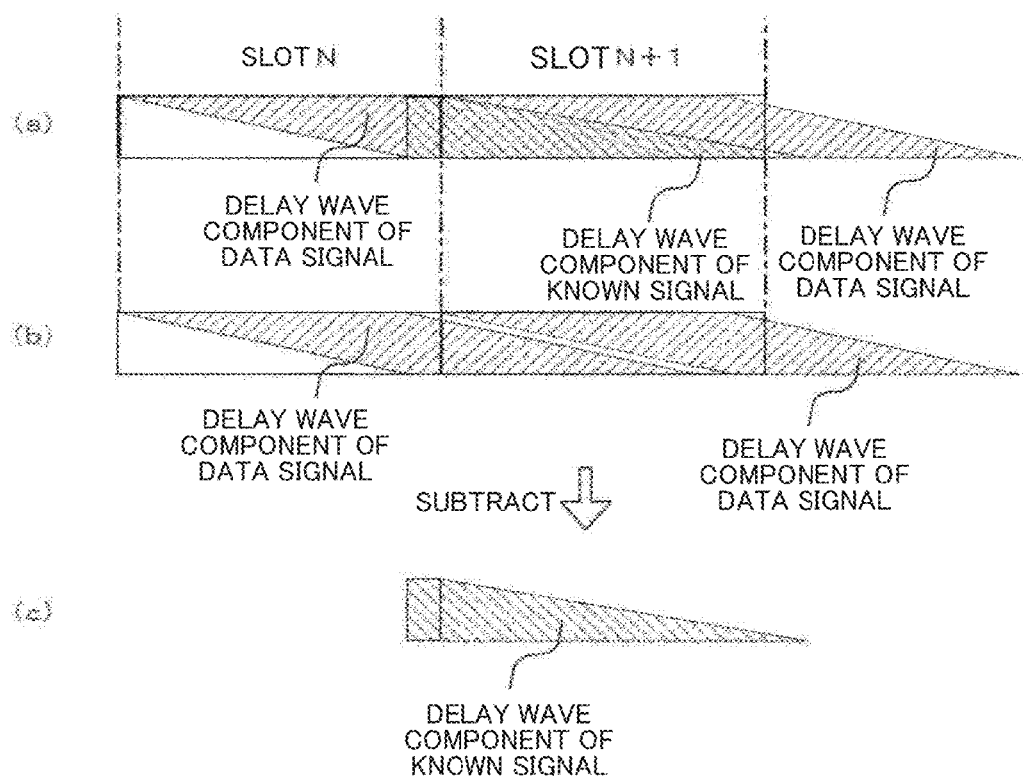
FIG. 5(a) is a diagram schematically illustrating a radio frame received by the reception unit.
FIG. 5(b) is a diagram schematically illustrating a data signal component including a delay wave component calculated by a calculation unit.
FIG. 5(c) is a diagram schematically illustrating a known signal component including a delay wave component extracted by an extraction unit.

FIG. 5 is a diagram schematically illustrating processing of extracting a known signal component including a delay wave component in the extraction unit 206. FIG. 5(a) is a diagram schematically illustrating a radio frame received by the reception unit 202. FIG. 5(b) is a diagram schematically illustrating the data signal component including the delay wave component calculated by the calculation unit 204. FIG. 5(c) is a diagram schematically illustrating the known signal component including the delay wave component extracted by the extraction unit 206.

For example, the extraction unit 206 subtracts the data signal component including the delay wave component (FIG. 5(b)) calculated by the calculation unit 204 from the radio frame (FIG. 5(a)) received by the reception unit 202 to extract the known signal component including the delay wave component (FIG. 5(c)).

Figure 6:
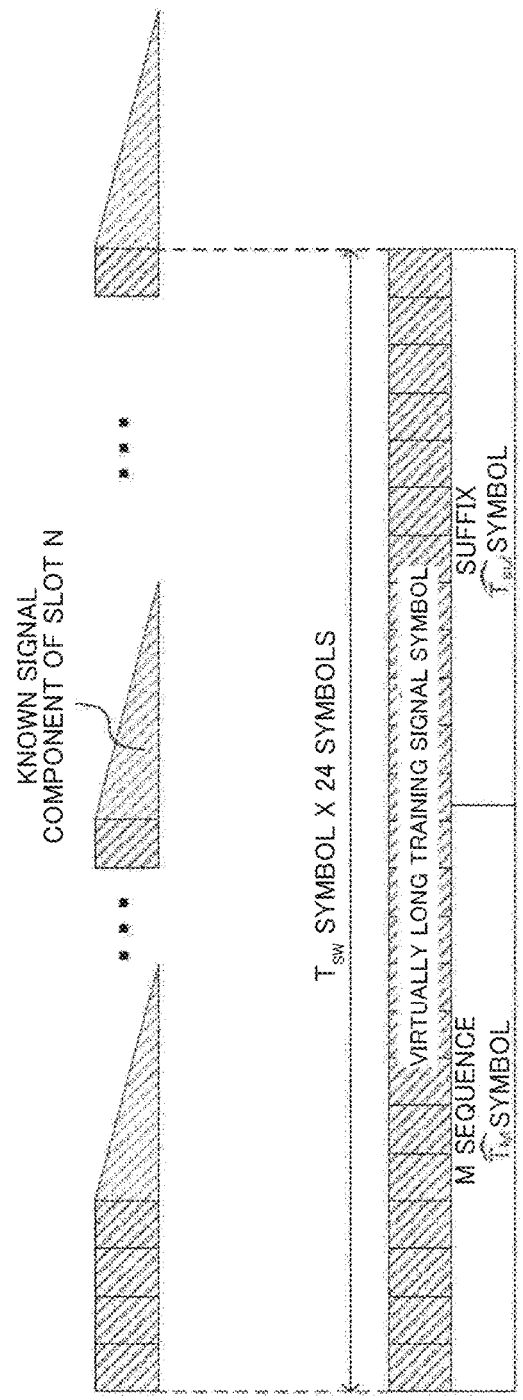
FIG. 6 is a diagram schematically illustrating a virtually long training signal section restored by a restoration unit.

The restoration unit 208 concatenates the plurality of known signal components extracted by the extraction unit 206 to restore the known signal having a predetermined length, and outputs the restored known signal having a predetermined length to the estimation unit 210. For example, as illustrated in FIG. 2, the restoration unit 208 concatenates 24 synchronization words ($T_{sw}$ symbols) divided and arranged in slots 9 to 32 of subframes 2 to 4. That is, the restoration unit 208 generates a virtually long training signal section (a known signal having a predetermined length: $T_{sw}$ symbols×24 symbols), as schematically illustrated in FIG. 6.

The estimation unit 210 performs channel estimation on the basis of the known signal having a predetermined length restored by the restoration unit 208, and outputs a channel estimation result to the control unit 212, for example.

The control unit 212 controls the respective units constituting the terminal station 20. For example, the control unit 212 controls the equalization scheme in which the equalization processing unit 214 compensates the radio frame received by the reception unit 202 on the basis of the channel estimation performed by the estimation unit 210. Further, the control unit 212 causes a tap coefficient of the equalization processing unit 214 to converge using the plurality of synchronization words described above.

The equalization processing unit 214 compensates the radio frame input from the reception unit 202 using an equalizer (not illustrated) under the control of the control unit 212 and outputs the compensated radio frame to the demodulation unit 216. For example, the equalization processing unit 214 optimizes the compensation by switching between a plurality of equalizers with different characteristics or by switching between the numbers of taps of the equalizer under the control of the control unit 212.

The demodulation unit 216 demodulates the radio frame compensated for by the equalization processing unit 214 and outputs the demodulated radio frame to the information bit detection unit 218.

The information bit detection unit 218 detects the radio frame data signal (information bit) demodulated by the demodulation unit 216 and outputs the detected data signal to the control unit 212, for example.

The transmission unit 220 acquires from the control unit 212 the result of the channel estimation performed by the estimation unit 210 on the basis of the known signal that the base station 10 divides and arranges in the frames, and transmits the acquired result of the channel estimation to the base station 10 via an antenna.

Figure 7:
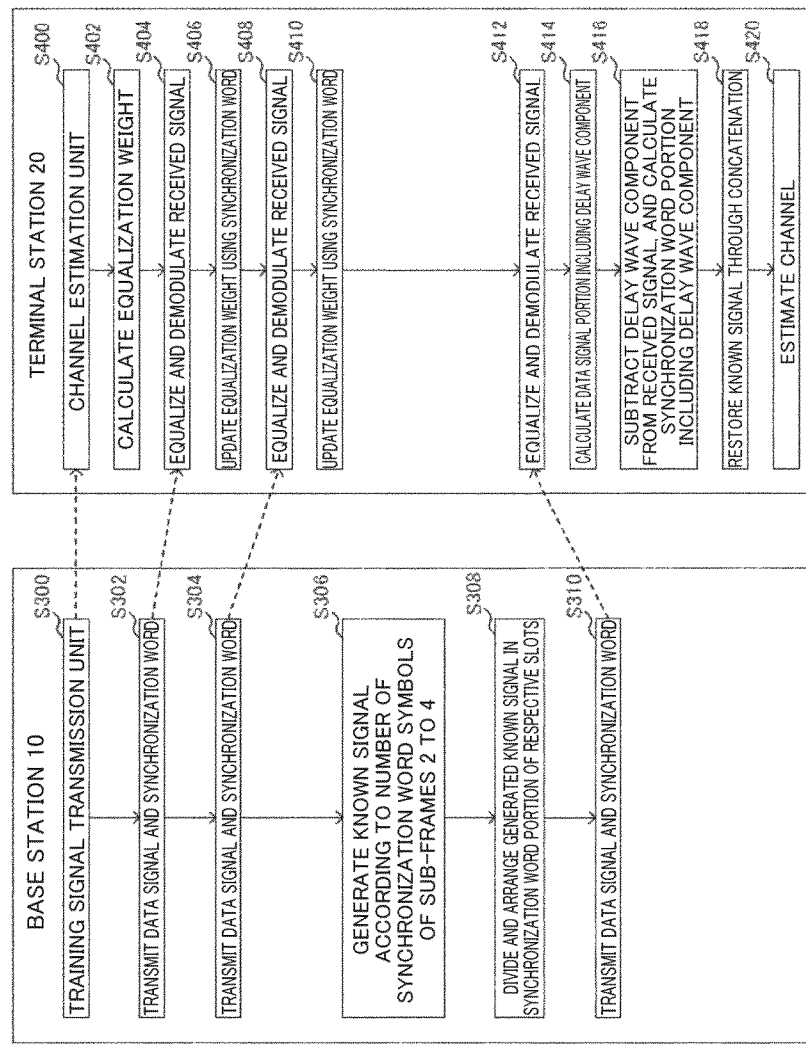
FIG. 7 is a diagram illustrating an operation example of a wireless communication system including a base station and a terminal station.

Next, an operation example of the wireless communication system including the base station 10 and the terminal station 20 will be described. FIG. 7 is a diagram illustrating an operation example of the wireless communication system including the base station 10 and the terminal station 20.

As illustrated in FIG. 7, when the base station 10 transmits a fixed-length training signal included in slot 1 of subframe 1 (S300), the terminal station 20 estimates (coarsely estimates) the channel response (S400), and calculates an equalization weight (S402).

When the base station 10 transmits the data signal and the synchronization word of slot 2 included in subframe 1 (S302), the terminal station 20 equalizes and demodulates the received signal (S404), and updates the equalization weight using the synchronization word (S406).

Further, when the base station 10 transmits the data signal and the synchronization word of slots 3 to 8 included in subframe 1 (S304), the terminal station 20 equalizes and demodulates the received signal (S408), and updates the equalization weight using the synchronization word (S410).

Next, the base station 10 generates a known signal corresponding to the number of synchronization word symbols in subframes 2 to 4, for example (S306), divides and arranges the generated known signal into synchronization word portions of slots 9 to 32 (S308), transmits the data signal and the synchronization word of subframes 2 to 4 (S310).

The terminal station 20 equalizes and demodulates the data signal and synchronization word (received signal) of subframes 2 to 4 (S412), and calculates a data signal component including a delay wave portion (S414).

Further, the terminal station 20 subtracts the delay wave component of the data signal from the received signal, calculates the synchronization word portion including the delay wave component (S416), and concatenates the calculated synchronization word portion including the delay wave component to restore a known signal having a predetermined length (virtually long training signal section) (S418).

The terminal station 20 estimates the channel response using the restored known signal having a predetermined length (S420).

Thus, in the wireless communication system including the base station 10 and the terminal station 20 according to the embodiment, because the terminal station 20 concatenates the plurality of known signal components to restore a known signal having a predetermined length, it is possible to improve the accuracy of channel estimation without reducing the transmission capacity even in a long delay wave environment.

In this case, because the base station 10 does not perform changing the frame configuration (such as extending the training signal section), it is possible to extend a delay wavelength that can be estimated by the terminal station 20 without reducing the transmission capacity, and to improve the accuracy of the channel estimation.

The channel estimation method using known signal such as the training signal or the synchronization word described above performed by the wireless communication system according to the embodiment can be applied even when a communication scheme, frame structure, or the like differs as long as the system performs the channel estimation in a time domain.

That is, the base station 10 may receive the result of channel estimation of the terminal station 20 and change a communication scheme for a radio frame (including frame configuration, modulation order, and the like). Further, the terminal station 20 may be configured to switch between equalization schemes or update the equalization weight according to the result of the channel estimation.

Further, the wireless communication system according to the embodiment may be configured not only to improve the accuracy of the channel estimation, but also to simply detect the presence or absence of a delayed delay wave that is not assumed, to switch between communication schemes.

Further, in the above-described embodiments, the M sequence signal has been used as the training signal, but the present invention is not limited thereto and the channel estimation method according to the embodiment can also be applied to other sequence signals used for channel response estimation.

Further, respective functions of the base station 10 and the terminal station 20 may be partially or wholly configured by hardware such as a programmable logic device (PLD) or a field programmable gate array (FPGA), or may be configured as a program executed by a processor such as a CPU.

For example, the base station 10 and terminal station 20 can be realized using a computer and a program, and the program can be recorded on a storage medium or provided through a network.

REFERENCE SIGNS LIST

10 Base station
20 Terminal station
102 Information bit generation unit
104 Modulation unit
106 Known signal generation unit
108 Division and arrangement unit
110 Transmission unit
112 Reception unit
114 Control unit
202 Reception unit
204 Calculation unit
206 Extraction unit
208 Restoration unit
210 Estimation unit
212 Control unit
214 Equalization processing unit
216 Demodulation unit
218 Information bit detection unit
220 Transmission unit

The invention claimed is:

1. A channel estimation method, comprising:
dividing and arranging a known signal having a predetermined length in frames;
transmitting, as a radio frame, the known signal divided and arranged in the frames together with a data signal;
receiving the transmitted radio frame;
calculating a data signal component including a delay wave component from the received radio frame;
extracting a plurality of known signal components each including a delay wave component of the divided and arranged known signal by subtracting the data signal component from the received radio frame;
concatenating the plurality of extracted known signal components to restore the known signal having the predetermined length; and
performing channel estimation on the basis of the restored known signal having the predetermined length.

2. The channel estimation method according to claim 1, further comprising:
controlling an equalization scheme for compensating the received radio frame on the basis of the channel estimation performed.

3. The channel estimation method according to claim 1, wherein the known signal includes a training signal and a synchronization word.

4. The channel estimation method according to claim 3, wherein the known signal is divided and arranged such that the training signal is included in a first slot of a frame and the synchronization word is included in at least one subsequent slot of the frame.

5. The channel estimation method according to claim 4, wherein the synchronization word is divided among multiple subsequent slots of the frame.

6. The channel estimation method according to claim 5, wherein the frame has 32 slots and the synchronization word is divided into slots 2 through 32.

7. A wireless communication system in which a reception device performs channel estimation on the basis of a known signal transmitted by a transmission device, wherein the transmission device includes:
division and arrangement circuitry configured to divide and arrange the known signal, the known signal having a predetermined length in frames; and
a transmitter to transmit, as a radio frame, the known signal divided and arranged in the frames by the division and arrangement circuitry together with a data signal, and
the reception device includes:
a receiver to receive the radio frame transmitted by the transmitter;
calculation circuitry configured to calculate a data signal component including a delay wave component from the radio frame received by the receiver;
extraction circuitry configured to extract a plurality of known signal components each including a delay wave component of the divided and arranged known signal by subtracting the data signal component from the radio frame received by the receiver;
restoration circuitry configured to concatenate the plurality of known signal components extracted by the extraction circuitry to restore the known signal having the predetermined length; and
estimation circuitry configured to perform the channel estimation on the basis of the known signal having the predetermined length restored by the restoration circuitry.

8. The wireless communication system according to claim 7, wherein the reception device further includes:
control circuitry configured to control an equalization scheme for compensating the radio frame received by the receiver on the basis of the channel estimation performed by the estimation circuitry.

* * * * *